Aug. 25, 1931. H. W. COOPER 1,820,182
APPARATUS FOR PRODUCING LAMINATED MICA WASHERS
Filed July 16, 1927
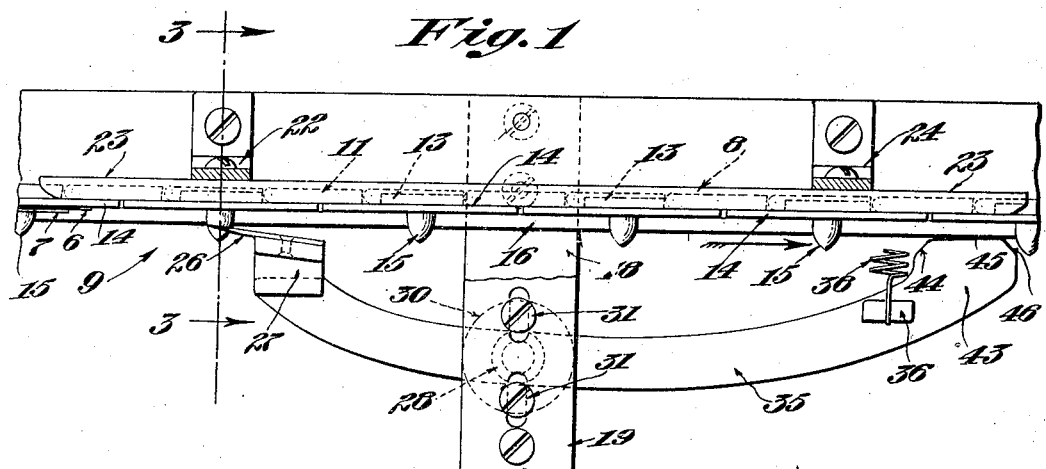
Fig.1
Fig.2
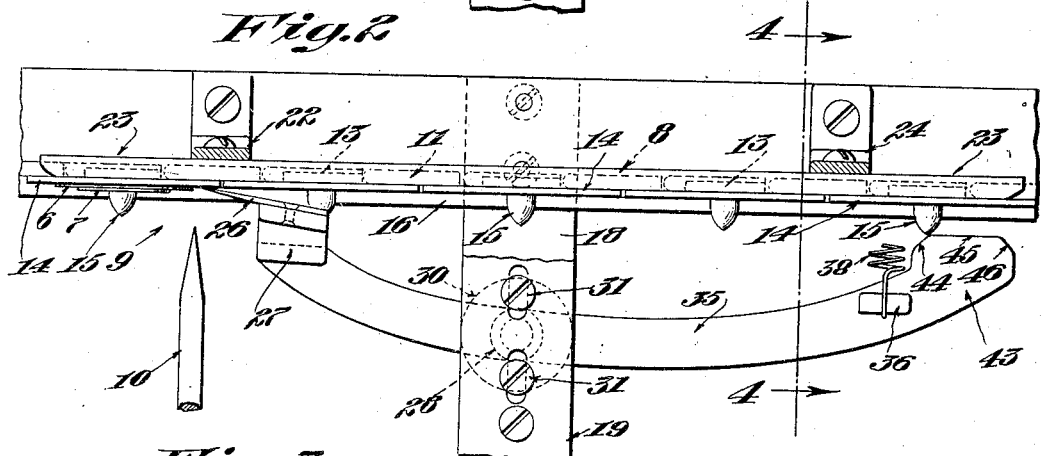
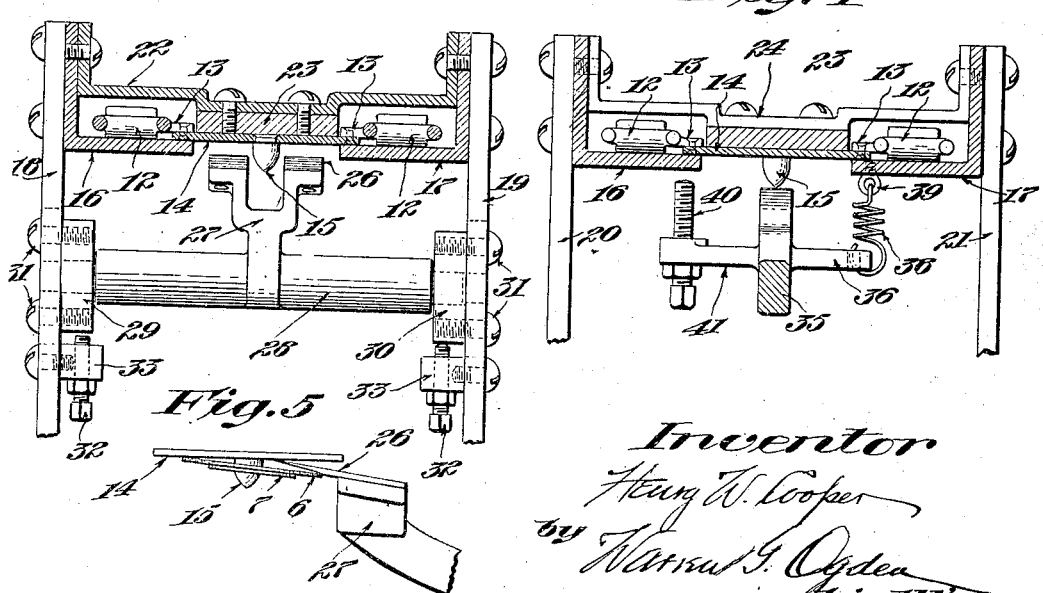
Fig.3  Fig.4
Fig.5
Inventor
Henry W. Cooper
by Warren G. Ogden
his Atty.

Patented Aug. 25, 1931

1,820,182

UNITED STATES PATENT OFFICE

HENRY W. COOPER, OF WEST NEWTON, MASSACHUSETTS, ASSIGNOR TO NEW ENGLAND MICA CO., OF WALTHAM, MASSACHUSETTS, A CORPORATION OF MASSACHUSETTS

APPARATUS FOR PRODUCING LAMINATED MICA WASHERS

Application filed July 16, 1927. Serial No. 206,351.

This invention relates to apparatus for producing laminated washers that are especially useful in making commutator rings requiring reinforced bottoms. The preferred material is composite sheet mica in which the several flakes and layers of flakes are caused to adhere by a suitable binder, such as shellac.

At the present time it requires three operations to make commutator rings having reinforced bottoms. In the first operation quantities of disks of two different diameters are dinked from sheets of the composite mica. Preferably the disks are in the form of washers, the central opening, however, being smaller than that in the finished commutator ring. In the second operation two washers, one of the smaller size and one of the larger size, are assembled in the form of a laminated washer which, in the third operation, is molded after heating to form a unitary article to form a commutator ring having a reinforced bottom. The second operation may be performed in an apparatus having a conveyer or carrier upon which the two washers to be united are first superimposed loosely. While on the conveyer, the two loosely superimposed washers are heated, united and cooled and then the unitary articles each comprised of a pair of united washers are ejected from the carrier and may be stacked as they are ejected for transfer to and use in the molding machine which performs the third operation.

The principal object of the present invention is to provide novel and efficient mechanism for ejecting the laminated washer, when produced as above described, from the carrier of the apparatus performing the second operation.

To the accomplishment of this object, and such others as may hereinafter appear, the various features of the present invention relate to certain devices, combinations and arrangements of parts fully set forth hereinafter, the advantages of which will be readily understood by those skilled in the art.

The various features of the present invention will be best understood from an inspection of the accompanying drawings, in which:

Figure 1 is a detail, in elevation, of the upper run of an endless carrier showing the washer ejecting mechanism in its normal inoperative position;

Fig. 2 is a view similar to Fig. 1 showing the carrier in a more advanced position from that of Fig. 1 with the ejecting mechanism in position to pry an advancing laminated washer from the carrier;

Fig. 3 is a detail, in sectional elevation, on the line 3—3, Fig. 1;

Fig. 4 is a detail, in sectional elevation, on the line 4—4, Fig. 2; and

Fig. 5 is a detail showing how the prying prongs of the ejector operate to pry a laminated washer from the carrier.

In accordance with the invention illustrated in the drawings a large disk 6 and a small disk 7 of composite sheet mica in a dry and hard condition and each having a central opening of the same size, are superimposed loosely on an endless carrier 8, at a loading station (not shown), at the lower run of the carrier, from which station the superimposed disks are carried to an ejecting station 9, at the upper run of the carrier. During their passage from the loading station to the ejecting station the loosely superimposed disks are first heated and the heated disks are then subjected to pressure and molded to insure their concentricity and their adherence to each other during any subsequent operation to be performed thereon. During this molding operation, the central openings in the disks are aligned and the peripheries of the disks are positioned accurately in concentric relationship. After these operations the pair of united disks are held on the link-belt carrier as a unitary article (see Fig. 2). After the united disks have been cooled they are ejected from the carrier 8, and conveniently stacked on a spindle 10 for a later discharge to a machine for molding the laminated washer thus produced into commutator rings having bottoms reinforced by the smaller disk.

A machine having the features thus briefly described is disclosed in my co-pending application for United States Patent Serial No. 206,350, filed of even date herewith, the drawings of that application illustrating another form of the ejecting mechanism claimed herein. Generic claims will be found in said co-pending application.

The carrier 8 is a link-belt, endless conveyer comprising two parallel, spaced chains 11 the alternate and opposite links 12 (Figs. 3 and 4) of each of which are provided with a shelf 13. Secured to each of the opposed pair of shelves 13 is a plate 14 comprising a link of a flexible belt. Centrally of each of the plates 14 is a centering pin 15 for locating the disk 6 on the plate 14 and also for superimposing the disk 7 centrally upon the disk 6.

The link-belt carrier 8 is driven continuously in any convenient manner. The chains 11 at the upper horizontal run of the link-belt carrier 8 are supported upon horizontal beams 16 and 17 (Figs. 3 and 4) secured to the vertical posts 18, 19, 20 and 21 which are bolted at their bases to the machine frame (not shown).

In order to maintain a portion, at least, of the upper horizontal run of the link-belt carrier 8 in a definite fixed path, the beams 16 and 17 carry a plate 22 to which one end of a central block 23 is secured to bear on the plates 14 as they pass successively beneath the block and prevent their lifting off of the beams 16 and 17. The posts 20 and 21 also carry a second plate 24 to which the other end of the block 23 is secured.

In order to eject each pair of united disks when it reaches the ejecting station 9, the vertical posts 18 and 19 support a pair of prying prongs 26 which, as shown in Figs. 2 and 5, are periodically actuated into engagement with the plates 18 successively to pry the advancing pairs of united disks from the plates 14 and pins 15. The disks pried from the plates 14 and off of pins 15 by the prying prongs 26 fall by gravity and are threaded on the spindle 10.

The prying prongs 26, which have a blade-like formation, are secured to a yoke 27 to provide clearance (Fig. 3) for the pins 15 to pass freely between the prongs. The yoke 27 projects from a rock-shaft 28 the opposite ends of which are journaled in bearings 29 and 30, carried, respectively, by the vertical posts 18 and 19. The position of the bearings 29 and 30 may be adjusted vertically by means of the slot and screw connections 31 between the bearings and the vertical posts. To aid in raising and lowering the bearings vertically on the posts 18 and 19, and to obtain a fine adjustment of position, the bearings engage screws 32 which are threaded for adjustment into blocks 33 secured to the vertical posts 18 and 19.

In order to hold the prying prongs 26 in their lowered or normal inoperative position (see Fig. 1) the rock-shaft 28 carries an arm 35 having near its rear end a lateral lug 36. One end of a coiled spring 38 is hooked to the lug 36 and its other end is hooked through an eye-bolt 39 depending from the beam 17. The rocking movement of the arm 35 under the influence of the spring 38 is adjustably limited by a screw 40 carried by a second lateral lug 41 on the arm 35. Upward movement of the arm 35 and downward movement of the prongs 26 is limited by an engagement of the screw 40 with the beam 16.

In order to elevate the prying prongs 26 at the proper time into engagement with the plates 14 in readiness for the prongs to enter behind and pry the united disks from the plates, the rear end of the arm 35 is provided with a cam end 43 having a beveled forward end 44 which is normally held in the path of the pins 15 by the spring 38 and proper adjustment of the screw 40. As the carrier advances the bevel 44 is engaged successively by the pins 15, whereupon the rock-shaft 28 is turned in a clock-wise direction, viewing Fig. 2, thus to elevate the prying prongs 26 to a position in engagement with a plate 14. Adjacent the bevel 44 on the cam end 43 is a horizontal surface 45 which functions to hold the prying prongs 26 against the plate 14 until the advance of the plate brings the prongs into prying engagement with the disk 6. The cam 43 is also provided with a rear end bevel 46 shaped to permit it to slip by each actuating pin 15, as the pin passes forward, to insure the instant depression of the prongs 26, under the influence of the spring 38, as soon as the washer to be ejected reaches the region of the spindle 10. The parts 27, 28 and 35 may be described as a rocker-arm having prying prongs on one end and an actuating arm on the other end.

Fig. 1 shows the position of the ejecting mechanism just after it has been operated to eject one of the united pairs of mica disks. As there illustrated the positioning pin 15 at the extreme right has cleared the rear end bevel 46 on the rocker-arm thus permitting the spring 38 to depress the prying prongs to eject the washer from the link of the carrier that is second from the left in Fig. 1. As the carrier 8 continues to move to the right (Figs. 1 and 2) the cam end 43 is successively engaged by each positioning pin 15 in the series. The bevel 44 is designed and located to rock the prying prongs 26 into engagement with the loaded link which is advancing into the ejecting station 9. As illustrated the fourth pin 15 in advance of the loaded link is the actuator for the rocker-arm. The surface 45 on the cam end is shaped to hold the prying prongs 26 against the link at least until the relative position of the prongs and link shown by Fig. 5 is attained, thus causing the prongs to pry in between the surface of the link and the disk 6 of the united pair held on the link. As the shanks of the prying prongs are angularly arranged relatively to the disk supporting surface of the link these shanks act to loosen the laminated washer from the link and pin whereupon it falls by gravity. The end bevel 46 functions to restore the rocker-arm to the influence of the spring 38 thus to return the parts of the ejecting mechanism to the position of Fig. 1. The downward movement of the prongs 26 ejects the washer, if need be, and throws it onto the spindle 10. The block 23, by engagement with the back face of the link engaged by the prying prongs, resists the thrust of the prying prongs tending to elevate the engaged link and, by engagement with the back face of the link upon which is mounted the positioning pin which contacts with the cam end 43, resists the thrust of the cam tending to elevate the engaged link. The block 23 thus cooperates with the beams 16 and 17 in causing the link-belt carrier 8 to move in a fixed path through the ejecting station.

The details and mechanical devices illustrated comprise a good practical form of the invention but it is to be understood that these may be varied in form, disposition and arrangement and still be within the invention as pointed out in the appended claims.

What is claimed as new, is:—

1. An apparatus of the class described having, in combination, a carrier for conducting a series of united pairs of mica disks on its under surface in succession to an ejecting station, means for causing the carrier to move in a fixed path through the ejecting station, and mechanism beneath the carrier and movable toward and from its under surface for engaging and ejecting the united pairs on the carrier as each pair successively reaches the ejecting station.

2. An apparatus of the class described having, in combination, a link-belt carrier adapted to hold a united pair of mica disks flatwise on each link and movable to conduct said disks through an ejecting station, an ejecting device at said station mounted independently of the carrier and held normally in a position preventing engagement with the disks as they pass, and an ejector operating member on each link acting successively on the ejector to move it into the plane of the links to engage and pry the disks from the carrier.

3. An apparatus of the class described having, in combination, a carrier for conducting in succession united pairs of mica disks to an ejecting station, means for causing the carrier to move through the ejecting station, a device for ejecting the pairs of disks on the carrier as they successively reach the ejecting station comprising a rocker-arm having a pair of prying prongs on one end, means for normally holding the prongs in an inactive position, and means on the carrier for operating the rocker arm comprising a series of actuating members adapted successively to engage said arm and periodically move the prongs into prying position, the arrangement being such that the ejection of any pair of disks at the ejecting station is effected by an actuating member of the series that has previously passed through the ejecting station.

4. An apparatus of the class described having, in combination, a carrier for conducting in succession united pairs of mica disks to an ejecting station, means for causing the carrier to move through the ejecting station, a device for engaging said carrier and entering between a pair of mica disks and the carrier as each united pair reaches the ejecting station, and mechanism for moving said device into and out of engagement with said carrier comprising a cam and a follower, one of which is movable with the carrier.

5. An apparatus of the class described having, in combination, a carrier for conducting in succession united pairs of mica disks to an ejecting station, a series of positioning pins on the carrier one for each united pair, means for causing the carrier to move in a fixed path through the ejecting station, a device for engaging and prying a pair of mica disks from the carrier as each united pair reaches the ejecting station, and means successively engaged by said pins for moving said device into and out of engagement with said carrier.

6. An apparatus of the class described having, in combination, a carrier for conducting in succession united pairs of mica disks to an ejecting station, a series of positioning pins on the carrier one for each pair of disks, means for causing the carrier to move in a fixed path through the ejecting station, prying prongs for engaging said carrier and for disengaging a pair of disks from the carrier as each pair reaches the ejecting station, an arm upon which said prongs are mounted to straddle the path of movement of the positioning pins, a rock-shaft for the arm, a second arm on the rock-shaft, a cam on the second arm, and means for holding said cam in the path of movement of said positioning pins.

7. An apparatus of the class described having, in combination, a carrier for conducting in succession united pairs of mica disks to an ejecting station, a series of positioning pins on the carrier one for each pair of mica disks, means for causing the carrier to move in a fixed path through the ejecting station, prying prongs for engaging said carrier and for disengaging a pair of mica disks from the carrier as each pair of disks reach the ejection station, an arm upon which the prongs are mounted to straddle the path of movement of the positioning pins, a rock-shaft for the arm, a second arm on the rock-shaft, a cam on the second arm, and means for holding said cam in the path of movement of said positioning pins and said prongs in an inactive position, said cam, when engaged by a passing pin, acting to move and hold the prongs in prying engagement for an interval and then to restore them to their inactive position.

8. An apparatus of the class described having, in combination, a link-belt carrier having a positioning pin on each link for conducting in succession united pairs of mica disks to an ejecting station, one pair of disks being supported and positioned on each link and pin, a device for periodically engaging the disk supporting face of each link for prying the pair of disks therefrom as each link reaches the ejecting station, mechanism for moving said device into and out of engagement with said links, and means engaging the back face of each link for resisting the thrust of said device.

9. An apparatus of the class described having, in combination, a link-belt carrier for supporting and conducting a series of united pairs of mica disks, one pair on each link, in succession to an ejecting station, means for causing a plurality of said united pairs to pass through the ejecting station all in the same plane, a device adapted to move into and out of said plane for engaging and then ejecting a pair of disks, and a series of actuating members for said device one on each link of the carrier for periodically operating said device as the links pass through the ejecting station, the ejecting device and its actuating member being constructed to permit the member on each link while at the ejecting station to pass idly and to become active only after passing the ejecting station to eject a pair of disks on a following link then at the ejecting station.

HENRY W. COOPER.